US009018898B2

(12) United States Patent
Ziv et al.

(10) Patent No.: US 9,018,898 B2
(45) Date of Patent: Apr. 28, 2015

(54) REGULATION OF WIRELESSLY CHARGING MULTIPLE DEVICES FROM THE SAME SOURCE (75) Inventors: Aran Ziv, Madrid (ES); Leah Sherry, Milpitas, CA (US)

(73) Assignee: Sandisk Technologies Inc., Plano, TX (US)

( * ) Notice: Subject to any disclaimer, the term of this patent is extended or adjusted under 35 U.S.C. 154(b) by 380 days.

(21) Appl. No.: 13/486,772

(22) Filed: Jun. 1, 2012

(65) Prior Publication Data
US 2013/0207599 A1    Aug. 15, 2013

Related U.S. Application Data (60) Provisional application No. 61/597,278, filed on Feb. 10, 2012.

(51) Int. Cl.
H02J 7/00    (2006.01)
H02J 7/02    (2006.01)
H02J 5/00    (2006.01)

(52) U.S. Cl.
CPC ...... H02J 7/025 (2013.01); H02J 5/005 (2013.01)

(58) Field of Classification Search
CPC ....... H02J 7/0027; H02J 7/0044; H02J 7/025; H02J 5/005
See application file for complete search history.

(56) References Cited

U.S. PATENT DOCUMENTS

| 6,160,389 | A * | 12/2000 | Watts | 323/282 |
|---|---|---|---|---|
| 8,159,364 | B2 * | 4/2012 | Zeine | 340/693.1 |
| 8,428,528 | B2 * | 4/2013 | Sutton et al. | 455/130 |
| 8,471,642 | B2 * | 6/2013 | Hill | 331/117 R |
| 8,497,658 | B2 * | 7/2013 | Von Novak et al. | 320/108 |
| 2009/0174263 | A1 | 7/2009 | Baarman et al. | |
| 2009/0278493 | A1 * | 11/2009 | Alden | 320/108 |
| 2009/0284082 | A1 | 11/2009 | Mohammadian | |
| 2010/0171461 | A1 | 7/2010 | Baarman et al. | |
| 2010/0181961 | A1 | 7/2010 | Novak et al. | |
| 2010/0253281 | A1 * | 10/2010 | Li | 320/108 |
| 2011/0119135 | A1 | 5/2011 | Grilli et al. | |
| 2011/0133569 | A1 * | 6/2011 | Cheon et al. | 307/104 |
| 2011/0254377 | A1 * | 10/2011 | Wildmer et al. | 307/104 |
| 2011/0278945 | A1 * | 11/2011 | Wheatley et al. | 307/104 |

(Continued)

FOREIGN PATENT DOCUMENTS

WO    2009126963 A2    10/2009

OTHER PUBLICATIONS

The International Search Report and Written Opinion mailed May 13, 2013 in International Application No. PCT/US2013/022897, 13 pages.

(Continued)

Primary Examiner — Naum B Levin
(74) Attorney, Agent, or Firm — Toler Law Group, PC (57) ABSTRACT A method performed in a wireless power transfer receiver includes determining whether a power transfer rate of the wireless power transfer receiver is at or above a threshold. The method further includes, in response to the power transfer rate being at or above the threshold, alternating between a power receiving mode and a non-power receiving mode in the wireless power transfer receiver. The wireless power transfer receiver being in the non-power receiving mode increases an amount of transmitted power that is available to be received by one or more other wireless power transfer receivers.

29 Claims, 3 Drawing Sheets

(56) References Cited

U.S. PATENT DOCUMENTS

2011/0285349 A1* 11/2011 Widmer et al. ............... 320/108
2012/0025611 A1* 2/2012 Kamata et al. ................. 307/43
2012/0146576 A1* 6/2012 Partovi .......................... 320/108
2012/0193999 A1* 8/2012 Zeine ............................ 307/104
2013/0099585 A1* 4/2013 Von Novak et al. .......... 307/104
2014/0001882 A1* 1/2014 Cook et al. ................... 307/104

OTHER PUBLICATIONS

International Preliminary Report on Patentability mailed Aug. 12, 2014 in International Application No. PCT/US2013/022897, 8 pages.

* cited by examiner

REGULATION OF WIRELESSLY CHARGING MULTIPLE DEVICES FROM THE SAME SOURCE

CROSS-REFERENCE TO RELATED APPLICATIONS

The present application claims priority to U.S. Provisional Application No. 61/597,278, filed Feb. 10, 2012, which application is hereby incorporated by reference in its entirety.

FIELD OF THE DISCLOSURE

The present disclosure is generally related to wireless charging of devices.

BACKGROUND

Wireless charging systems allow powering and charging of portable devices by using energy from electrical or magnetic fields at proximity to the portable devices instead of providing power via a wired connection. Wireless charging may be used in various applications including electric tooth brushes, mobile phones, televisions, cars, etc. In these applications, typically a single transmitter (Tx) is used to charge a single receiver (Rx). Such a one-to-one relationship may be imposed due to limitations of magnetic induction (MI) technology. For example, a multi-device charging mat that uses MI technology includes several transmitters to support several receivers of devices that are placed on the mat, so that a one-to-one relationship between transmitters and receivers is maintained.

Wireless charging using magnetic resonance (MR) technology enables charging of multiple Rx devices to be charged simultaneously positioned in proximity to the Tx. MR charging power is affected by distance between the coils of the Tx and Rx and by coil geometry. For simplicity, "distance" is used herein to refer to both distance and geometry affecting wireless power transfer efficiency. MR charging may also be affected by cross-device effects. In particular, the device Rx of a first device that is closer to the Tx will draw more power from the MR field, leaving less power for a second device that is at a larger distance from the Tx than a first device. Hence, a charging time of the second device may be significantly longer than of the first device. Uneven charging times between the first device and the second device may impact a user experience. For example, a user may be frustrated to find that the second device is barely charged when the first device has already been fully charged.

SUMMARY

Multi-device wireless power transfer from a single transmitter using magnetic resonance is regulated to increase an amount of power that is received by devices that are more distant from the transmitter. For example, time division may cause a device nearer to the single transmitter to suspend wireless power reception temporarily to enable a more distant device to receive more power from the transmitter.

DETAILED DESCRIPTION

Systems and methods are disclosed that enable power regulation during wireless power transfer, such as during magnetic resonance (MR) charging of multiple devices from a transmitter to reduce a charging imbalance of more distant receivers as compared to receivers located near the transmitter in a MR charging system. As other examples, power regulation during wireless power transfer may be applied to a powering system (e.g., supplying power from a transmitter to multiple devices that do not have a re-chargeable battery) or a power restoring system.

Figure 1:
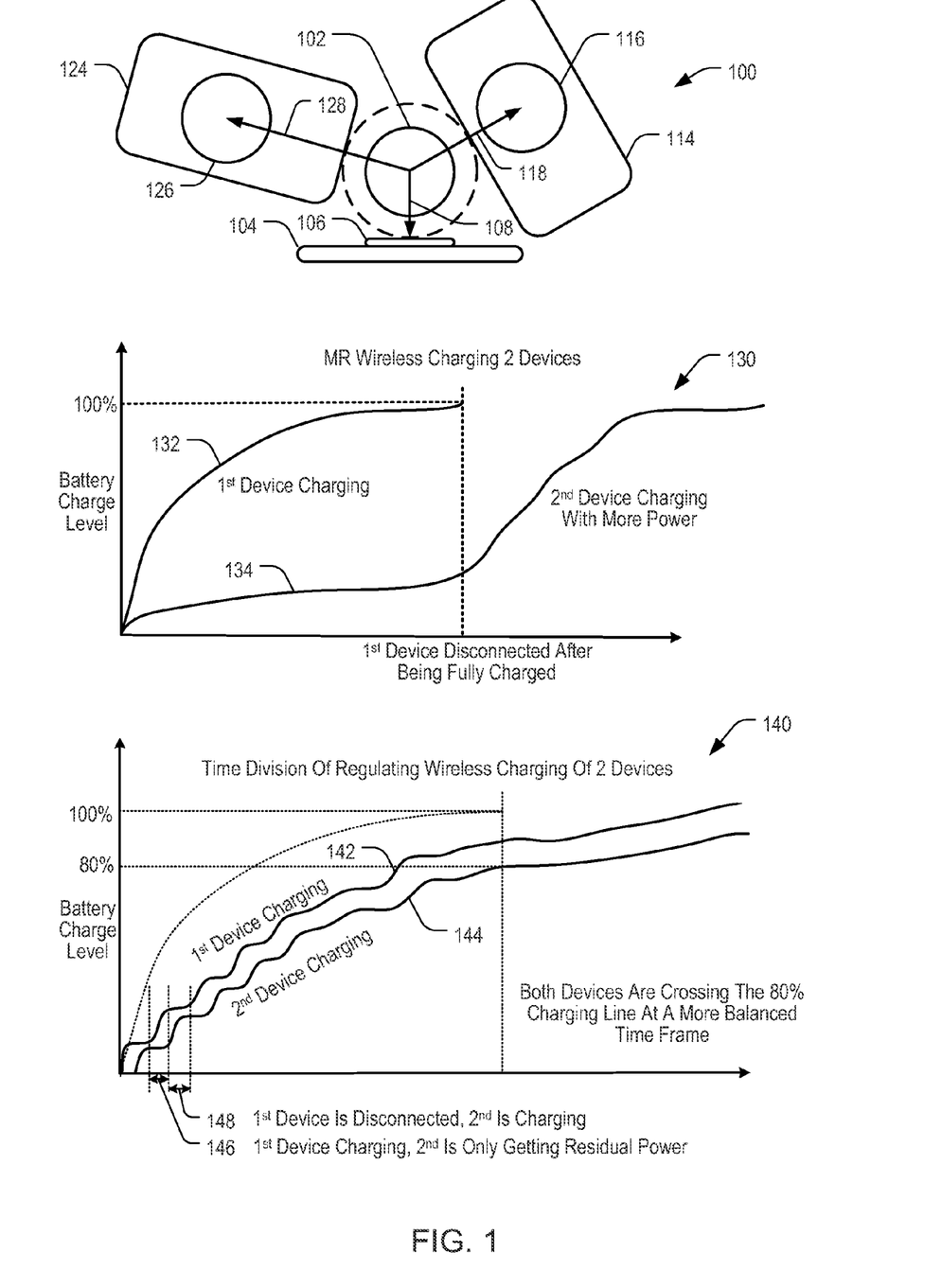
FIG. 1 is a general diagram of a particular illustrative embodiment of a system including multiple devices at various distances from a transmitter and graphically depicting wireless charging of two of the devices without time division as compared to wireless charging of the two device using time division based wireless charging.

FIG. 1 illustrates a particular embodiment of a system 100 including multiple devices 104, 114, and 124 at various distances from a transmitter 102. The first device 104 (e.g. a mobile phone on its side) is coupled to a first receiver 106 configured to charge a battery of the first device 104 using power received via MR from the transmitter 102. The second device 114 is coupled to a second receiver 116 configured to charge a battery of the second device 114 using power received via MR from the transmitter 102. The third device 124 is coupled to a third receiver 126 configured to charge a battery of the third device 124 using power received via MR from the transmitter 102.

Although each of the devices 104, 114, 124 is shown having a nearest edge at a common distance to the transmitter 102 (illustrated by a dashed circle), MR charging of the devices 104, 114, and 124 will vary based on the distance 108, 118, and 128, respectively, between a center of the transmitter 102 and a center of the respective receiver 106, 116, 126. As illustrated, the first device 104 has the shortest distance 108 and the third device 124 has the longest distance 128.

A first graph 130 illustrates a MR charging characteristic 132 of the first device 104 that is nearer the transmitter 102 and a charging characteristic 134 of the second device 114 that is further from the transmitter 102. The first device 104 receives more power and charges faster than the second device 114. After the first device 104 is fully charged, the first device 104 may disconnect from charging (e.g. the receiver 106 may go "out of resonance"), enabling the second device 114 to increase a charging rate due to more power being available to the second device 114.

An approach that uses the concept of flickering to reduce the level of energy consumed by a nearer device and releasing that energy to other devices, but in a different way and using different means, is proposed. Although magnetic resonance technology, for example, is a means to transfer energy, the proposed approach is not limited to MR technology and in other implementations time-division wireless charging may be performed using another energy transfer technology.

MR technology allows disconnecting of the Rx devices, by taking the Rx devices out of resonance, making the Rx devices "transparent" to the source Tx. The first graph 130 illustrates a straight forward solution, for example of two mobile phones that both are charged: the closer device charged with higher power and the second device (at a farther distance from a shared transmitter) charged with less power, until the first device is fully charged and disconnects itself. The first device disconnecting itself enables the second device to receive more power and complete charging at an increased rate as compared to prior to the first device disconnecting. Although both devices will eventually get charged, a latency for the second device to reach a significant charge level is much greater than for the first device, because as the second device may have to 'wait' for the first device to fully charge and disconnect before the second device can charge at an increased charging rate.

In other implementations, multiple transmitters Tx may be used with multiple power channels, via different resonance frequencies, each Tx supporting one Rx and including a communication protocol between the Rx and Tx to control power strength. Such systems may be more expensive and complicated as compared to the time division charging illustrated in a second graph 140.

The second graph 140 illustrates a time division regulated MR charging characteristic 142 of the first device 104 that is nearer the transmitter 102 and a time division regulated MR charging characteristic 144 of the second device 114 that is further from the transmitter 102. The first device 104 receives more power and charges faster than the second device 114 during a first representative time period 146. During a second representative time period 148, the first device 104 may disconnect from charging (e.g. the receiver 106 may go "out of resonance"), enabling the second device 114 to increase a charging rate due to more power being available to the second device 114. As a result, the battery charge level of the first device 104 and the second device 114 are more evenly balanced than in the non-time division MR charging depicted in the first graph 130.

A battery charge level of each device 104, 114 increases in the first device 104 and the second device 114 more evenly in the second graph 140 than in the first graph 130. For example, in the second graph 140, when the first device 104 is approximately 80% charged, the second device 114 is approximately 70% charged, compared to the first graph 130 when the first device 104 is approximately 80% charged, the second device 114 is approximately 20% charged.

Overview

Time division can be used to regulate the power between multiple devices with fairly minimal management and communication layers.

By going 'out of resonance' the devices (Rx) may remove themselves from the power scheme, temporarily ceasing to draw power and allowing more power to be received by the other device(s). By flickering by disappearing (going out of resonance) and re-appearing (returning into resonance) again and again, the device may regulate the amount of power that the device receives and that other devices receive at a ratio of a duration the device appears divided by a total duration of a disappear-reappear cycle (e.g. a length of the first time period 146 divided by a total length of the first time period 146 and the second time period 148.

Communication and control methods are disclosed to optimize and improve this technique.

A basic concept is to use the ability of the Rx to de-resonant and become transparent, leaving more power for the second device. Having the first device flicker at a constant or variable duty cycle may regulate the power draw of the first device, enabling more power to be received by the second device. In addition, having the first device flicker at a constant or variable duty cycle may regulate the power received by the first device to a lower level than is being transmitted.

Optionally, a variable duty cycle may be employed and may be set, for example, from a largest duty cycle of 50% of connected time and reduced to a lower duty cycle as the battery charge level increases. For example, when the first device battery charge level is 60% the first device may use 50% duty cycle, drawing approximately half of the available energy. When the battery reaches 80% the first device may reduce to 40% duty cycle (e.g. drawing approximately 40% of the available energy), and then when reaching 95% the device may draw approximately 10% power by using a 10% duty cycle.

Figure 3:
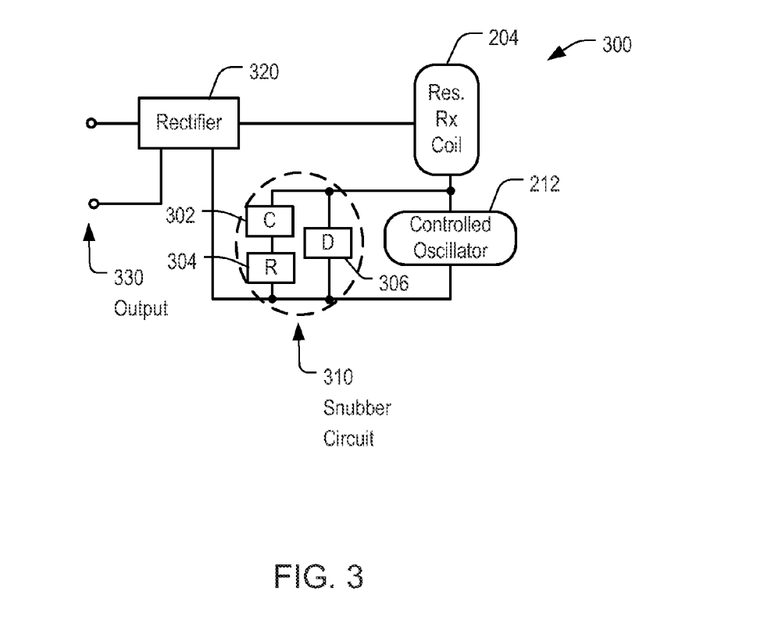
FIG. 3 is a block diagram of a particular illustrative embodiment of components of the receiver of FIG. 2.

A mechanism to smooth-out the flickering effect via a flickering spike absorbing means, such as an energy absorbing circuit, should be added to reduce the flickering spikes and to better shape power transfer by smoothing (or leveling) out the power level transmitted from the receiver power output (e.g. a power output of the receiver that is coupled to provide power to charge a battery of a mobile phone), as described in further detail with respect to FIG. 3. An energy absorbing means could be, for example, a snubber circuit consisting of a capacitor and, preferably, also a series resistor connected across the flickering circuit and configured for reducing and/ or eliminating voltage spikes from voltage transient and ringing the flickering creates. A high peak current rated capacitor and a series resistor that is a non-inductive, carbon composition or carbon film resistor might work better. Alternatively, depending on the flickering circuit configuration a suppressor diode, such as a Schottky diode, might also be suitable. As an alternative to a Schottky diode, a Zener diode circuit may be used in connection with regulating/minimizing voltage spikes.

Figure 2:
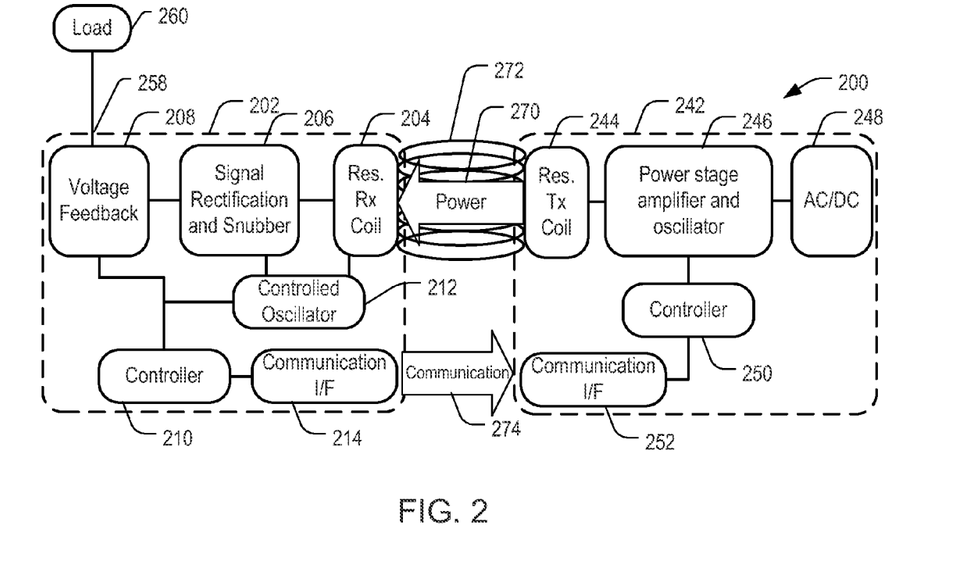
FIG. 2 is a block diagram of a particular illustrative embodiment of components of a receiver and a transmitter configured to perform time division wireless power transfer.

FIG. 2 depicts a particular embodiment of a system 200 including a receiver 202 and a transmitter 242 configured to perform time division wireless power transfer. For example, the transmitter 242 may correspond to the transmitter 102 of FIG. 1 and the receiver 202 may correspond to the receiver 106 of FIG. 1.

The transmitter 242 includes a resonant transmitter coil 244, a power stage amplifier and oscillator 246 coupled to the resonant transmitter coil 244, and a power supply circuit 248 coupled to the power stage amplifier and oscillator 246. A controller 250 is coupled to the power stage amplifier and oscillator 246 and to a communication interface (I/F) 252.

The power supply circuit 248 may be configured to receive external power, such as from a direct current (DC) power supply (e.g. a battery), an alternating current (AC) power supply (e.g. a wall socket), or a combination thereof. The power supply circuit 248 is configured to provide power to the power stage amplifier and oscillator 246.

The power stage amplifier and oscillator 246 may be configured to convert received power from the power supply circuit 248 to oscillating current through the resonant transmitter coil 244. The power stage amplifier and oscillator 246 may be responsive to the controller 250 to adjust an amount of power 270 that is provided via a magnetic field 272 generated by the resonant transmitter coil 244. For example, the power stage amplifier and oscillator 246 may be responsive to the controller 250 to adjust an amplitude, a frequency, or both, of alternating current through the resonant transmitter coil 244.

Figure 4:
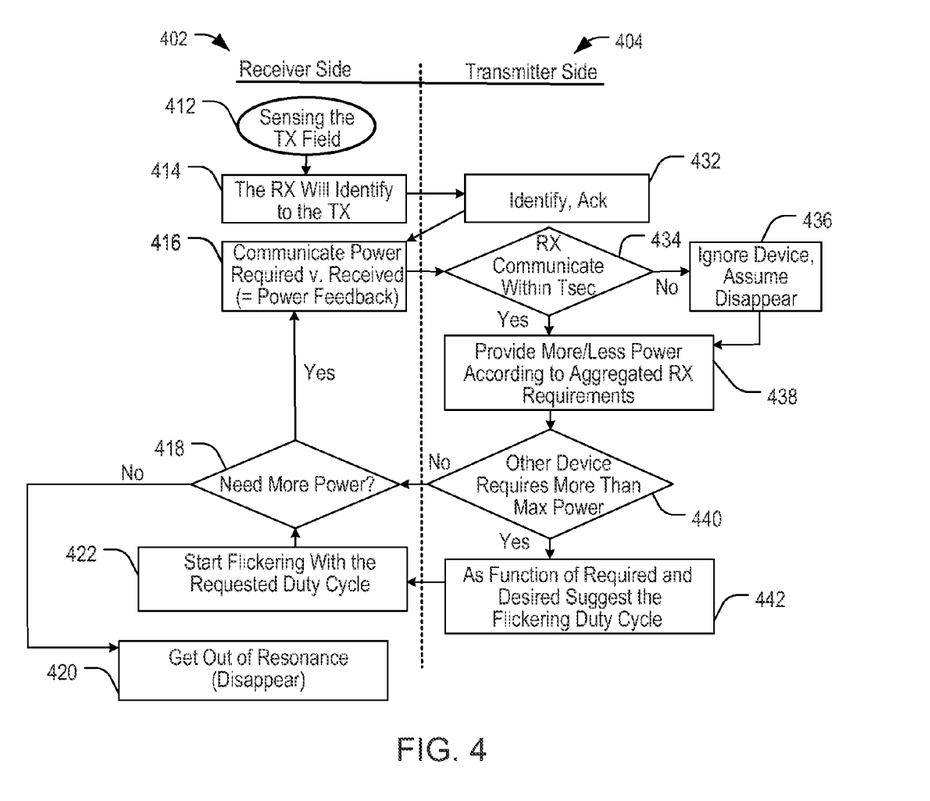
FIG. 4 is a flow chart of a particular illustrative embodiment of a method of time division wireless charging performed by a receiver and a transmitter.
Figure 5:
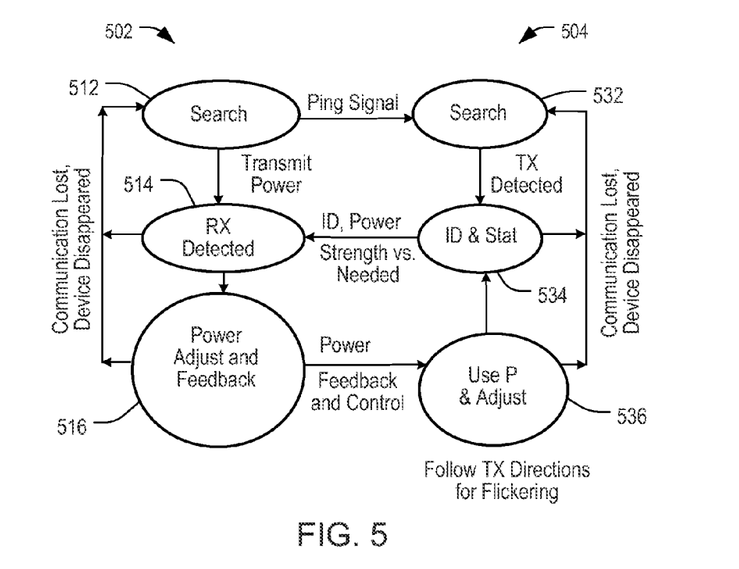
FIG. 5 is a diagram of a particular embodiment of states of a control mechanism of a transmitter and a receiver of a time division wireless charging system.

The controller 250 may be configured to be responsive to messaging received via the communication interface 252, such as described with respect to FIGS. 4-5. For example, in response to the controller 250 receiving an indication that one or more receivers request an increase of the power 270, the controller 250 may instruct the power stage amplifier and oscillator 246 to adjust operation to increase the power 270. As another example, in response to the controller 250 receiving an indication that one or more receivers are no longer receiving the power 270 (e.g. a receiver has dropped out of resonance), the controller 250 may instruct the power stage amplifier and oscillator 246 to adjust operation to decrease the power 270.

The communication interface 252 may enable the transmitter 242 to receive wireless signaling, such as a representative communication 274, from one or more other devices. To illustrate, the communication interface 252 may include an antenna and radio-frequency circuitry to enable wireless communication, such as via a short-range ad-hoc wireless network (e.g. Bluetooth), as an illustrative, non-limiting example. In an embodiment not specifically shown in FIG. 2, the communication interface 252 may enable the transmitter 242 to send wireless signals to one or more other devices, such as to instruct one or more receivers to initiate flickering to enable time-division wireless charging of multiple receivers, as one illustrative example, or to cease flickering, as another illustrative example.

The receiver 202 includes a resonant receiver coil 204 coupled to a signal rectification and snubber circuit 206 and to a controlled oscillator 212. The signal rectification and snubber circuit 206 is coupled to provide power to a load 260 via a voltage feedback stage 208. A controller 210 is coupled to the voltage feedback stage 208, to the controlled oscillator 212, and to a communication interface 214.

The controlled oscillator 212 may include circuit components such as capacitive components, inductive components, resistive components, or any combination thereof, that enable resonant (or near-resonant) oscillation of the resonant receiver coil 204 to receive at least a portion of the power 270 from the field 272. The controlled oscillator 212 is responsive to the controller 210 to "flicker," i.e. to alternately enable and disable resonant oscillation of the resonant receiver coil 204. For example, the controlled oscillator 212 may include one or more switching components to increase or decrease a capacitance encountered by a current flow through the resonant receiver coil 204 to adjust a resonant frequency of the resonant receiver coil 204. As another example, the controller oscillator 212 may include a switch to block current flow into and/or out of the resonant receiver coil 204.

The signal rectification and snubber circuit 206 may be configured to rectify an alternating current received from the resonant receiver coil 204 and to reduce or eliminate any flickering spikes and to shape power transfer by smoothing (or leveling) out the power level transmitted from a receiver power output 258 to the load 260. An example of components of the signal rectification and snubber circuit 206 is illustrated in FIG. 3.

The voltage feedback stage 208 may provide a power output to the load 260 and may enable feedback to be provided to the controller 210. For example, the feedback can indicate a magnitude of power transfer to the load 260 (e.g. a rate of battery charging). As another example, the feedback can indicate a power status received from the load 260, such as a battery fully charged indication.

The controller 210 may be configured to control operation of the controlled oscillator 212 in response to feedback from the voltage feedback stage 208, in response to one or more communications received via the communication interface 214, or any combination thereof. For example, in response to receiving an instruction from the transmitter 242 to initiate flickering according to a specified duty cycle, the controller 210 may be configured to send signals to cause the controlled oscillator 212 to enter resonance or to go out of resonance according to the specified duty cycle. The controller 210 may also be configured to initiate wireless communication with the transmitter 242, such as by instructing the communication interface 214 to send a representative communication 274 (e.g. in response to the voltage feedback stage 208 indicating that the received portion of the power 270 is below a threshold charging amount).

Although FIG. 2 depicts an illustrative example of components of a wireless power transfer system, in other implementations one or more components of the system 200 may differ from the example described with respect to FIG. 2. To illustrate, in some implementations the communication interface 252 may use the resonant receiver coil 204 to send and/or receive communications with the transmitter 242. For example, the resonant receiver coil 204 may be used as an antenna for radio-frequency communications. As another example, the resonant receiver coil 204 may be used to modulate the field 272 to convey information to the transmitter 242.

FIG. 3 illustrates a particular embodiment 300 of components of the receiver 202 of FIG. 2. The resonant receiver coil 204 is illustrated serially coupled to the controlled oscillator 212. A snubber circuit 310 (of the signal rectification and snubber circuit 206) is coupled in parallel with the controlled oscillator 212. A rectifier 320 is coupled to receive an input signal from the resonant receiver coil 204 and responsive to the controlled oscillator 212 to provide a rectified output signal at an output 330 (e.g. to the load 260). For example, the rectifier 320 may include a full-wave diode bridge with a smoothing capacitor.

The snubber circuit 310 is illustrated as including a capacitive component 302 (e.g. a capacitor) serially coupled to a resistive component 304 (e.g. a resistor) to reduce voltage spikes or other effects that may occur in response to the controlled oscillator 212 enabling or disabling resonant current oscillation through the resonant receiver coil 204. The snubber circuit 310 is also illustrated as including a diode element 306, such as a Schottky diode or a Zener diode, coupled in parallel across the controlled oscillator 212. Although the snubber circuit 310 is illustrated as including a resistor-capacitor (RC) path (i.e., a current path through the resistive component 304 and the capacitive component 302) and a diode path (i.e., a current path through the diode 306), in other implementations the snubber circuit 310 may include only one of the RC path and the diode path. Alternatively, the snubber circuit 310 may include one or more other types of circuit components (e.g. a resistor-inductor-capacitor (RLC) circuit). Alternatively, the snubber circuit 310 could be placed at other locations of the receiver 202, such as at the output 330.

Multiple alternatives for the charging regulation mechanism of the systems of FIGS. 1-2 exist. Below are a few examples.

One alternative for implementing the above novelty uses a standard separate communication layer between the Rx's and Tx. The communication layer allows the Rx to report the Tx for: charging power is OK (message [OK]), request to increase Tx power (message [I]), done, and about to disconnect (message [D]). As an example, in an implementation where two Rx's are at different distances from one Tx, when the Tx receives [I] the Tx will increase its power to deliver more power. If both Rx devices are OK (e.g. the Tx receives [OK] from both devices), the Tx will keep sending power until all devices have sent [D].

If the Tx reaches a power threshold, such as max power, and receives an [I] request, the Tx will send a message (e.g., indicating that the Tx is transmitting at max power (message [MaxP])). When an Rx receives [MaxP], if the Rx's status is OK (e.g. sending [OK] to the Tx), the Rx will flicker its resonance existence (i.e. will alternately disconnect and reconnect) to enable the other Rx device to get more power. When a Rx receives [MaxP], if the Rx's status is [I] (e.g. sending [I] to the Tx), the Rx will maintain the [I] status as long as the Tx transmits [MaxP].

An Rx that reaches a charged battery level will disconnect. If the Tx is able to detect only one device at charging (i.e. only one Rx), the Tx will stop messaging [MaxP] so that the Rx that needed more power is able to re-evaluate its power need (e.g. [I] or [OK]).

For an Rx that is not flickering, the Rx will determine its status of [OK], [I] or [D] by averaging the energy it receives during multiple cycles. For an Rx that is flickering, a status of [OK] is designated even if the decreased level of power due to the flickering would otherwise cause the Rx to send [I] to the Tx. For example, when an average level of power is at or above a charging rate threshold, a status of [OK] may be designated. When an average level of power is below the charging rate threshold, a status of [I] may be designated. For a Rx that is flickering, a status of [I] is not designated even if the average level of power due to the flickering would otherwise cause the Rx to send [I] to the Tx and instead a status of [OK] is designated.

Another implementation example may use the Tx as the central decision point to provide power according to the aggregated needs of the Rx and to instruct particular receivers Rx to use flickering mode. FIG. 4 depicts a flow diagram of a particular illustrative embodiment of a method of time division wireless charging 402 performed by a receiver and a method of time division wireless charging 404 performed by a transmitter.

The method of time division wireless charging 402 performed by the receiver (Rx) includes sensing a transmitter (Tx) field, at 412. The Rx identifies itself to the Tx, at 414, such as by sending identification information to the Tx. In response to receiving an acknowledgement (Ack) from the Tx, the Rx communicates to the Tx power feedback information regarding requested or required power of the Rx as compared to received power, at 416. The Rx may determine whether the Rx requires more power, at 418. In response to determining that the Rx requires more power, at 418, processing returns to 416 where the Rx communicates power feedback information to the Tx. Otherwise, if the Rx does not require more power, at 418, the Rx gets out of resonance (e.g. "disappears"), at 420.

The Rx may start flickering (i.e. alternately enter resonance and exiting resonance) with a requested duty cycle, at 422. For example, the Rx may receive a message from the Tx suggesting a flickering duty cycle. After entering a flickering charging mode, processing returns to make a determination whether more power is needed, at 418.

The method of time division wireless charging 404 performed by the transmitter (Tx) includes identifying a Rx and sending an acknowledgement (Ack), at 432. For example, the acknowledgement may be sent in response to receiving an identification message from the Rx. A determination may be made, for each Rx identified at the Tx, whether the Tx has received any communication from the Rx within a particular time period, such as whether any message is received from a particular Rx within a threshold number of seconds after a last communication was received from, or sent to, the particular Rx. In response to determining that no communication has been received from a particular Rx within the time period, at 434, the Tx may ignore the particular Rx and function as the Rx has disappeared (e.g. has been turned off, removed from within a charging range of the Tx, or has completed charging and left resonance, as illustrative examples).

The Tx determines whether to maintain power, provide more power, or provide less power, based on aggregated requirements of the Rx device(s) that have been received by the Tx, at 438. If total required and/or requested power of the Rx device(s) exceeds a maximum power output of the Tx, at 440, the Tx may send a message suggesting a flickering duty cycle, at 442. For example, the Tx may address the message to a particular Rx. As another example, the Tx may broadcast the message and each Rx may self-determine whether to enter a flickering mode according to the suggested duty cycle (e.g. if the Rx is receiving satisfactory power, and/or sent an [OK] message, the Rx may enter a flickering mode).

FIG. 5 illustrates a particular embodiment of states of a control mechanism 502 of a transmitter of a time division wireless charging system and states of a control mechanism of a receiver 504 of a time division wireless charging system.

The states 502 of the transmitter include:

Search 512: the Tx transmits a signal allowing the Rx to discover the Tx and to be discovered by the Tx. For example, the Tx may send a ping signal.

Detection 514: the Tx receives an identification of a Rx and an indication of received power strength as compared to a required power strength of the Rx (e.g. the Tx may receive a message indicating a difference between received power and required power at a Rx). Upon the Tx detecting a Rx, the Tx will send power to enable charging of the Rx.

Power Adjust and Feedback 516: The Tx analyzing power feedback information from the Rx(s) may adjust the power strength and may send a request for one or more of the receivers Rx(s) to flicker. An example for logic that may be used is described in additional detail below. The Tx transitions from the Power Adjust and Feedback state 516 to the Rx Detected state 514 to re-evaluate the power usage.

The states 504 of the receiver include:

Search 532: the Rx listens for a ping signal from the Tx

ID and Status 534: The Rx transmits identification information and power feedback information, such as data indicating required power and received power.

Use Power and Adjust 536: The Rx uses received power (e.g. to charge a battery). In response to receiving a request from the Tx to enter a flickering mode or to adjust a flicker duty cycle, the Rx may comply with the request of the Tx. The Rx returns from the Use Power and Adjust state 536 to the ID and Status state 534 to re-evaluate its power usage.

In case of no-signal being received following a defined time-out, the Tx or Rx will transition back to the Search state 512 or 532, respectively.

An example of logic that may be implemented by the Tx at the power adjustment phase includes:

1. The Tx aggregates the devices power requirements (Rxr)
2. If all the Rxr are coherent (i.e. unanimous) requests to increase or decrease power, then:
   a. Tx will follow, increasing power proportionally to the evaluated difference reported by the devices request.
3. If at least one device requires more power while other devices are OK or need more power as well, then:
   a. The Tx will evaluate which device needs the most power, the one with the biggest difference between the received and desired power (referred to as "device A"),
   b. The Tx will increase power such that the increase in power is proportional to a difference between received versus desired power of device A.
   c. The Tx directs the other devices to flicker at a duty cycle that will maintain the same energy received at each Rx as before the power increase. Such duty cycle will be the inverse of the proportion of the added strength. (For example: Tx increases power from T1 to T2, then it is expected that the Rx will receive power of R2=R1*T2/T1. The duty cycle Rx should be used to maintain a similar energy level as 1/(T2/T1)=T1/T2.)

4. If Tx reaches a power threshold (e.g., MAX_POWER) and at least one device requires more power, then a. Direct the devices with the minimal gap between received and desired power to flicker at a duty cycle that attempts to even out the devices' proportions between the desired and received energy. The approximate calculation for such optimization is system dependent. The other devices may flicker at a same duty cycle or at different duty cycles.

If more information exists, for example the level of Rx battery charged, then improved charging balancing between devices may be reached.

In conjunction with the disclosed embodiments, a method may be performed in a wireless charging receiver. The method includes receiving a power usage indication from a wireless charging transmitter. For example, the power usage message may be a [MaxP] message indicating that the wireless charging transmitter is transmitting at a maximum power. As another example, the power usage message may be a message requesting receiver flickering and indicating a suggested duty cycle.

In response to receiving the power usage indication, the wireless charging receiver enters a power receiving mode and exits the power receiving mode according to a duty cycle. For example, the first device 146 enters the power receiving mode upon entering the first time period 146 of FIG. 1 and exits the power receiving mode upon entering the second time period 148 of FIG. 1. Entering the power receiving mode can include entering a magnetic resonance state to receive power from a magnetic resonance transmitter. Exiting the power receiving mode can include exiting the magnetic resonance state, or going "out of resonance." In some implementations power may be received by the wireless charging receiver when not in the power receiving mode at a significantly reduced rate as compared to power reception in the power receiving mode.

Exiting the power receiving mode increases an amount of transmitted power that is available to be received by one or more other wireless charging receivers. The wireless charging receiver may include an energy absorbing circuit configured to reduce voltage spikes in an output of the wireless charging receiver that result from entering and exiting the power receiving mode. As an example, the energy absorbing circuit may include a capacitor coupled to a series resistor. As another example, the energy absorbing circuit may include a Schottky diode and/or a Zener diode.

A method may be performed in a wireless charging transmitter, such as the transmitter 102 of FIG. 1. The method may include transmitting power to be received by at least a first wireless charging receiver and a second wireless charging receiver. The wireless charging transmitter may send a message to the first wireless charging receiver to exit a power receiving mode. Sending the message to the first wireless device may enable more power to be provided to the second wireless device while the first wireless devices is not in the power receiving mode. The message may cause the first wireless charging receiver to enter the power receiving mode after temporarily exiting the power receiving mode, such as according to a duty cycle.

Although various components depicted herein are illustrated as block components and described in general terms, such components may include one or more microprocessors, state machines, or other circuits configured to enable the transmitter 102 and the devices 104, 114, and 124 (along with the receivers 106, 116, and 126) of FIG. 1 to operate according to a time-division wireless charging protocol. For example, physical components, such as hardware controllers, state machines, logic circuits, or other structures, may be used to enable the receiver 106 of FIG. 1 to operate according to the method 402 of FIG. 4 and/or according to the operating states 504 of FIG. 5. As another example, physical components, such as hardware controllers, state machines, logic circuits, or other structures, may be used to enable the transmitter 102 of FIG. 1 to operate according to the method 404 of FIG. 4 and/or according to the operating states 502 of FIG. 5.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
in a wireless power receiving system, performing:
providing a power usage indication, wirelessly, to a wireless power transfer system that prompts the wireless power transfer system to determine whether a power receiving state of the wireless power receiving system is at or above a threshold;
receiving a mode indication from the wireless power transfer system associated with the power receiving state being at or above the threshold, and in response to the mode indication, alternating the wireless power receiving system between a power transfer mode and a non-power transfer mode; and
with the wireless power receiving system being in the non-power transfer mode, consuming substantially no power wirelessly transferred from the wireless power transfer system so as to make more of the power wirelessly transferred available for consumption by one or more other wireless power receiving systems.

2. The method of claim 1, further comprising, with the wireless power receiving system being in the power transfer mode, consuming power wirelessly transferred from the wireless power transfer system with a duty cycle based on duty cycle information received from the wireless power transfer system.

3. The method of claim 1, wherein the wireless power receiving system is a charging receiver.

4. The method of claim 1, wherein the wireless power receiving system initiates the alternating between the power transfer mode and the non-power transfer mode according to a duty cycle.

5. The method of claim 1, further comprising, with the wireless power receiving system being in the power transfer mode, receiving the power via magnetic resonance (MR).

6. The method of claim 1, wherein the wireless power receiving system includes an energy absorbing circuit configured to reduce voltage spikes in an output of the wireless power receiving system that result from alternating between the power transfer mode and the non-power transfer mode.

7. The method of claim 6, wherein the energy absorbing circuit includes a capacitor coupled to a series resistor.

8. The method of claim 6, wherein the energy absorbing circuit includes at least one of a Schottky diode and a Zener diode.

9. The method of claim 1, wherein alternating the wireless power receiving system between the power transfer mode and the non-power transfer mode is based on duty cycle information wirelessly received from the wireless power transfer system via a message addressed to the wireless power receiving system.

10. A wireless power receiving system comprising:
a controller;
a communication interface; and
a controlled oscillator configured to be coupled to a resonant receiver coil,
wherein in response to wirelessly receiving a mode indication from a wireless power transfer system via the communication interface, wherein the mode indication is associated with a power receiving state of the wireless power receiving system being at or above a threshold, the controller is configured to cause the controlled oscillator to alternate between a power transfer mode and a non-power transfer mode, and with the wireless power receiving system being in the non-power transfer mode, the controller is configured to cause the wireless power receiving system to consume substantially no power wirelessly transferred from the wireless power transfer system so as to make more of the power wirelessly transferred available for consumption by one or more other wireless power receiving systems.

11. The wireless power receiving system of claim 10, wherein the controller is further configured, with the wireless power receiving system being in the power transfer mode, to cause the wireless power receiving system to consume power wirelessly transferred from the wireless power transfer system with a duty cycle based on duty cycle information received from the wireless power transfer system.

12. The wireless power receiving system of claim 10, wherein the wireless power receiving system is a charging receiver.

13. The wireless power receiving system of claim 10, wherein the controller is configured to initiate the alternating between the power transfer mode and the non-power transfer mode according to a duty cycle.

14. The wireless power receiving system of claim 10, wherein with the wireless power receiving system being in the power transfer mode, the wireless power receiving system receives power via magnetic resonance (MR).

15. The wireless power receiving system of claim 10, further comprising an energy absorbing circuit.

16. The wireless power receiving system of claim 15, wherein the energy absorbing circuit includes a capacitor coupled to a series resistor.

17. The wireless power receiving system of claim 15, wherein the energy absorbing circuit includes at least one of a Schottky diode and a Zener diode.

18. The wireless power receiving system of claim 10, wherein the controller is configured to cause the controlled oscillator to alternate between the power transfer mode and the non-power transfer mode based on duty cycle information wirelessly received from the wireless power transfer system via a message addressed to the wireless power receiving system.

19. A method comprising:
in a wireless power transfer system, performing:
receiving, wirelessly, from a wireless power receiving system, an indication of whether a power receiving state of the wireless power receiving system is at or above a threshold;
in response to the power receiving state being at or above the threshold, causing the wireless power receiving system to alternate between a power transfer mode and a non-power transfer mode; and
with the wireless power receiving system being in the non-power transfer mode, increasing power transfer to one or more other wireless power receiving systems.

20. The method of claim 19, further comprising, determining a duty cycle and providing the duty cycle to the wireless power receiving system so as to allow the wireless power receiving system to receive transferred power at the duty cycle when the wireless power receiving system is in the power transfer mode.

21. The method of claim 19, further comprising, in response to the wireless power transfer system transferring power at a threshold power level, causing a second wireless power receiving system to alternate between the power transfer mode and the non-power transfer mode.

22. A method of wirelessly charging computing systems comprising:
receiving an indication from each of the computing systems as to whether each of the computing systems is being wirelessly charged at a satisfactory charging rate; and
increasing a charging power wirelessly transmitted to the computing systems if at least one of the computing systems indicates an unsatisfactory charging rate, the computing systems being configured to use more of the wirelessly transmitted charging power when the computing systems are being charged at an unsatisfactory charging rate and after increasing the charging power.

23. The method of claim 22, wherein the satisfactory charging rate indicates a rate at or above a threshold charging rate.

24. The method of claim 23, wherein when the charging power being wirelessly transmitted to the computing systems is at a maximum value and at least one of the computing systems indicates an unsatisfactory charging rate, an indication is transmitted to the computing systems indicating that the charging power is at the maximum value.

25. The method of claim 24, wherein when the charging power being wirelessly transmitted to the computing systems is at the maximum value and a first of the computing systems indicates an unsatisfactory charging rate and a second of the computing systems indicates a satisfactory charging rate, the second of the computing systems is configured to alternate between an on-charging period of time and an off-charging period of time allowing for more of the wirelessly transmitted charging power to be available to the first of the computing systems during the off-charging period of time.

26. The method of claim 25, wherein as a charge on the second of the computing systems increases, the off-charging period of time increases and the on-charging period of time decreases.

27. The method of claim 26, wherein the computing systems are configured to indicate when the computing systems are fully charged before transitioning to an off-charging mode.

28. The method of claim 27, wherein when only one computing system is being wirelessly charged and after the indication of the charging power being at the maximum value has been transmitted, the only one computing system is configured to adjust a rate at which the only one computing system is wirelessly being charged.

29. The method of claim 1, wherein the power usage indication is a request for a power increase of the power receiving state, and wherein the mode indication identifies that the power receiving state is at a maximum level.

* * * * *